US012724688B2

(12) United States Patent
Anderson et al.

(10) Patent No.: US 12,724,688 B2
(45) Date of Patent: Sep. 1, 2026

(54) CHAOS EVENT TESTING USING SIMULATED TRAFFIC FEED AND CHAOS EVENTS SIMULTANEOUSLY

(71) Applicant: The PNC Financial Services Group, Inc., Pittsburgh, PA (US)

(72) Inventors: Erik James Anderson, Pittsburgh, PA (US); Connor Daniel Thompson, Pittsburgh, PA (US); Rocio Milagros Roman Siuce, Sacramento, CA (US); Jonathan DuComb Edwards, Pittsburgh, PA (US); Michael Robert William Minella, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 204 days.

(21) Appl. No.: 18/341,130

(22) Filed: Jun. 26, 2023

(65) Prior Publication Data

US 2025/0036546 A1 Jan. 30, 2025

(51) Int. Cl.
*G06F 11/3604* (2025.01)
*G06F 11/3698* (2025.01)

(52) U.S. Cl.
CPC ...... *G06F 11/3608* (2013.01); *G06F 11/3698* (2025.01)

(58) Field of Classification Search
CPC ......................... G06F 11/3608; G06F 11/3698
See application file for complete search history.

(56) References Cited

U.S. PATENT DOCUMENTS

| | | | |
|---|---|---|---|
| 10,445,207 | B2 | 10/2019 | Vedurumudi et al. |
| 10,467,127 | B2 | 11/2019 | Teitelbaum |
| 11,086,763 | B2 | 8/2021 | Liu |
| 11,336,675 | B2 | 5/2022 | Sbandi et al. |
| 11,397,591 | B2 | 7/2022 | Sastry |
| 11,467,952 | B2 | 10/2022 | Pande et al. |

(Continued)

OTHER PUBLICATIONS

Dominik Kesim, “Assessing resilience of software systems by the application of chaos engineering: a case study,” 2019 [retrieved on Mar. 11, 2025], pp. 1-166, downloaded from <url>:https://elib.uni-stuttgart.de/items/9193c396-d0e6-4aae-a007-92c63202baf7. (Year: 2019).*

(Continued)

*Primary Examiner* — S. Sough
*Assistant Examiner* — Stephen D Berman
(74) *Attorney, Agent, or Firm* — K&L Gates LLP

(57) ABSTRACT

Computer systems and methods perform a chaos experiment for a target application. The computer system: (i) generates, for the chaos experiment, a simulated traffic stream for a non-production version of the target application; (iii) provides chaos event settings for one or more chaos conditions to the non-production version of the target application; (iv) executes the non-production version of the target application during the chaos experiment, such that the non-production version of the target application, during the chaos experiment, (a) generates responses to the simulated traffic stream while simultaneously (b) being subject to the one or more chaos conditions of the chaos event settings; and (iv) monitors the responses generated by the non-production version of the target application during the chaos testing.

19 Claims, 6 Drawing Sheets

(56) References Cited

U.S. PATENT DOCUMENTS

| | | | | |
|---|---|---|---|---|
| 11,636,019 | B2 | 4/2023 | Shah et al. | |
| 11,847,046 | B1 * | 12/2023 | Ayyadurai | G06F 11/3684 |
| 2009/0319249 | A1 * | 12/2009 | White | H04L 41/145 703/13 |
| 2010/0197296 | A1 * | 8/2010 | Bovet | H04W 24/06 455/424 |
| 2017/0060730 | A1 * | 3/2017 | Li | G06Q 10/06395 |
| 2019/0278688 | A1 * | 9/2019 | Alsheich | G06F 11/3024 |
| 2020/0366573 | A1 * | 11/2020 | White | G06F 9/45558 |
| 2021/0173767 | A1 * | 6/2021 | Zhang | G06F 11/3698 |
| 2021/0182170 | A1 | 6/2021 | Vedurumudi et al. | |
| 2021/0263836 | A1 * | 8/2021 | Singh | G06F 11/3698 |
| 2021/0329022 | A1 * | 10/2021 | Chhetri | H04L 67/34 |
| 2022/0158926 | A1 * | 5/2022 | Wennerström | H04L 43/20 |
| 2022/0210044 | A1 * | 6/2022 | Rao | H04L 41/0816 |
| 2022/0224718 | A1 | 7/2022 | Sarda et al. | |
| 2022/0276953 | A1 * | 9/2022 | Padala | G06F 11/3433 |
| 2022/0398187 | A1 * | 12/2022 | Balasubramanian | G06F 11/3698 |
| 2023/0032461 | A1 | 2/2023 | Mengwasser et al. | |
| 2023/0318929 | A1 * | 10/2023 | Soosahabi | G06F 11/3688 709/224 |
| 2024/0036112 | A1 * | 2/2024 | Cruz | G01R 31/31719 |

OTHER PUBLICATIONS

Chaos Mesh, “Run a Chaos Experiment, ” Mar. 14, 2022 [retrieved Aug. 30, 2025], pp. 1-4, downloaded from the Wayback Machine at <url>: https://web.archive.org/web/20220314154012/https://chaos-mesh.org/docs/run-a-chaos-experiment. (Year: 2022).*

Ubik Ingenierie, “Running Video Streaming Load Test with Taurus, JMeter and UbikLoadPack,” 2021 [retrieved Nov. 29, 2025], pp. 1-12, downloaded from <url>:https://web.archive.org/web/20210614022418/https://www.ubik-ingenierie.com/blog/running-video-streaming-load-test-with-taurus-jmeter-and-ubikloadpack/. (Year: 2021).*

Antione Varet et al., “How to Generate Realistic Network Traffic?,” 2014 [retrieved Nov. 29, 2025], IEEE 38th Annual Computer Software and Applications Conference, pp. 299-304, downloaded from <url>:https://ieeexplore.ieee.org/stamp/stamp.jsp?tp=&arnumber=6899230&tag=1. (Year: 2014).*

Kashi Vishwanath et al., “Realistic and responsive network traffic generation,” 2006, Proceedings of the 2006 conference on Applications, technologies, architectures, and protocols for computer communications, pp. 111-122, downloaded from <url>:https://dl.acm.org/doi/pdf/10.1145/1159913.1159928. (Year: 2006).*

Gautam et al., “A Study on Chaos Engineering for improving Cloud Software Quality and Reliability”, Jan. 3, 2023 [retrieved Mar. 27, 2026], pp. 1-7, downloaded from <url>:https://ieeexplore.ieee.org/abstract/document/9993998. (Year: 2023).*

Dirk Draheim et al., “Realistic load testing of Web applications”, 2006 [retrieved Mar. 27, 2026], pp. 1-11, downloaded from <url>:https://ieeexplore.ieee.org/abstract/document/1602358. (Year: 2006).*

Suman De et al., “A Study on Chaos Engineering for improving Cloud Software Quality and Reliability”, Feb. 3, 2022 [retrieved Mar. 27, 2026], pp. 289-294, downloaded from <url>:https://ieeexplore.ieee.org/stamp/stamp.jsp?tp=&arnumber=9688292. (Year: 2022).*

Hornsby, “Chaos Engingeering—How to safel inject failure in your application?”, Chaos Engineering with Canary deployments, The Cloud Architect (May 8, 2020).

Domnu, “Chaos Engingeering With LitmusChaos”, Red Hat Hybrid Cloud (Oct. 27, 2021).

Learning Apache JMeter, Free unaffiliated eBook created from Stack Overflow contributors, https://riptutorial.com/.

* cited by examiner

CHAOS EVENT TESTING USING SIMULATED TRAFFIC FEED AND CHAOS EVENTS SIMULTANEOUSLY

BACKGROUND

Containerized applications are applications that run in isolated runtime environments called containers. Containers encapsulate an application with all its dependencies, including system libraries, binaries, and configuration files. This all-in-one packaging makes a containerized application portable by enabling it to behave consistently across different hosts allowing developers to write once and run almost anywhere. Containers, however, do not include their own operating systems (OS). Different containerized applications running on a host system, instead, share the existing OS provided by that system. Without any need to bundle an extra OS along with the application, containers are extremely lightweight and can launch very fast. To scale an application, more instances of a container can be added almost instantaneously.

Chaos engineering is a method of testing distributed production software that deliberately introduces failure and faulty scenarios to the production software to verify its resilience in the face of disruptions, random or otherwise. These disruptions can cause applications to respond unpredictably and break under pressure.

SUMMARY

In one general aspect, the present invention is directed to computer-implemented systems and methods for chaos testing a target application. The target application can be, for example, a containerized application or running on a virtual machine. The chaos testing can test a production or non-production (e.g., offline) version of the target application. Performing the testing on a non-production version protects any online, production version of the target application from being affected by the chaos testing. During the chaos-testing for a non-production version of the target application, the non-production version can (i) generate responses to a simulated traffic stream (e.g., HTTP request) for the target application while simultaneously (ii) being subject to one or more chaos conditions that can be specified by a user, e.g., a person or team running the chaos experiment. These and other benefits realizable from embodiments of the present invention will be apparent from the description that follows.

FIGURES

Various embodiments of the present invention are described herein by way of example in connection with the following figures.

DESCRIPTION

Various embodiments of the present invention are directed to systems and methods for performing chaos testing, such as for a software application, particularly a containerized application or an application running on a virtual machine (VM). At the outset, as background and in connection with FIGS. 1 and 2, general details about virtualized environments, including ones with containerized applications, are provided. Then aspects of the novel chaos testing of the present invention are described. Then how the novel chaos testing techniques can be applied to a VM is described. In contrast to containers, a VM usually contains its own OS.

Figure 1:
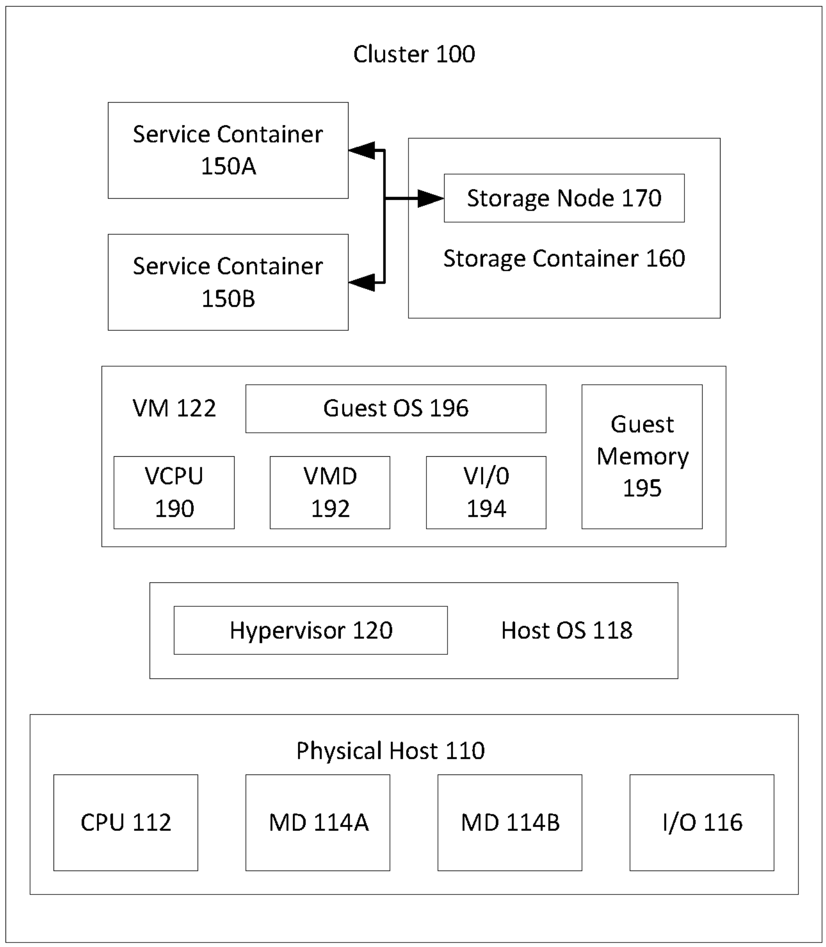
FIG. 1 is block diagram of a computer cluster according to various embodiments of the present invention.

FIG. 1 is a block diagram of a computer cluster 100, such as OpenShift Dedicated cluster, according to various embodiments of the present invention. The cluster 100, which may be implemented in a cloud-computing environment, may include one or more physical hosts, including physical host 110. Physical host 110 may in turn include one or more physical processor(s) (e.g., CPU) 112 communicatively coupled to one or more memory device(s) 114A-B and one or more input/output device(s) (e.g., I/O) 116. The processor(s) 112 is an electronic device capable of executing instructions encoding arithmetic, logical, and/or I/O operations. The processor(s) 112 may include an arithmetic logic unit (ALU), a control unit, and a plurality of registers. In an example, the processor(s) 112 may be a single core processor which is typically capable of executing one instruction at a time (or process a single pipeline of instructions), or a multi-core processor which may simultaneously execute multiple instructions and/or threads. In another example, the processor(s) 112 may be implemented as a single integrated circuit, two or more integrated circuits, or may be a component of a multi-chip module (e.g., in which individual microprocessor dies are included in a single integrated circuit package and hence share a single socket). The processor(s) 112 may also be referred to as a central processing unit ("CPU").

The memory devices 114A-B may be volatile or non-volatile memory devices, such as RAM, ROM, EEPROM, or any other device capable of storing data. The memory devices 114A may be persistent storage devices such as hard drive disks ("HDD"), solid-state drives ("SSD"), and/or persistent memory (e.g., Non-Volatile Dual In-line Memory Module ("NVDIMM")). I/O device(s) 116 refers to devices capable of providing an interface between one or more processor pins and an external device, the operation of which is based on the processor inputting and/or outputting binary data. CPU(s) 112 may be interconnected using a variety of techniques, ranging from a point-to-point processor interconnect, to a system area network, such as an Ethernet-based network. Local connections within physical hosts 110, including the connections between processor(s) 112 and memory devices 114A-B and between processor(s) 112 and I/O device 116 may be provided by one or more local buses of suitable architecture, for example, peripheral component interconnect (PCI).

The physical host 110 may run one or more isolated guests, for example, a VM 122, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 122). In an example, containers that perform a unified function may be grouped together in a container cluster that may be deployed together, e.g., in a Kubernetes® pod. A pod is a group of one or more containers, with shared storage and network resources, and a specification of how to run the containers. A pod's contents can be co-located and co-schedule, and run in a shared context.

The cluster 100 may run one or more VMs (e.g., VMs 122), by executing a software layer (e.g., hypervisor 120) above the hardware and below the VM 122. The hypervisor 120 may be a component of respective host operating system 118 executed on physical host 110, for example, implemented as a kernel based virtual machine function of host operating system 118. In another example, the hypervisor 120 may be provided by an application running on host operating system 118. The hypervisor 120 may also run directly on physical host 110 without an operating system beneath hypervisor 120. Hypervisor 120 may virtualize the physical layer, including processors, memory, and I/O devices, and present this virtualization to VM 122 as devices, including virtual central processing unit ("VCPU") 190, virtual memory devices ("VMD") 192, virtual input/output ("VI/O") device 194, and/or guest memory 195. In an example, another virtual guest (e.g., a VM or container) may execute directly on host OSs 118 without an intervening layer of virtualization.

The VM 122 may be a virtual machine and may execute a guest operating system 196, which may utilize the underlying VCPU 190A, VMD 192A, and VI/O 194A. Processor virtualization may be implemented by the hypervisor 120 scheduling time slots on physical CPUs 112 such that from the guest operating system's perspective those time slots are scheduled on a virtual processor 190. The VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196 such as guest memory 195 provided to guest OS 196. In an example, storage container 160 and/or service containers 150A, 150B are similarly implemented.

In addition to distributed storage provided by storage container 160, a storage controller may additionally manage storage in dedicated storage nodes (e.g., NAS, SAN, etc.). In an example, a storage controller may deploy storage in large logical units with preconfigured performance characteristics (e.g., storage nodes 170). In an example, access to a given storage node (e.g., storage node 170) may be controlled on an account and/or tenant level. In an example, a service container (e.g., service containers 150A-B) may require persistent storage for application data, and may request persistent storage with a persistent storage claim to an orchestrator of the cluster 100. In the example, a storage controller may allocate storage to service containers 150A-B through a storage node (e.g., storage nodes 170) in the form of a persistent storage volume. In an example, a persistent storage volume for service containers 150A-B may be allocated a portion of the storage capacity and throughput capacity of a given storage node (e.g., storage nodes 170). In various examples, the storage container 160 and/or service containers 150A-B may deploy compute resources (e.g., storage, cache, etc.) that are part of a compute service that is distributed across multiple clusters (not shown in FIG. 1).

Figure 2:
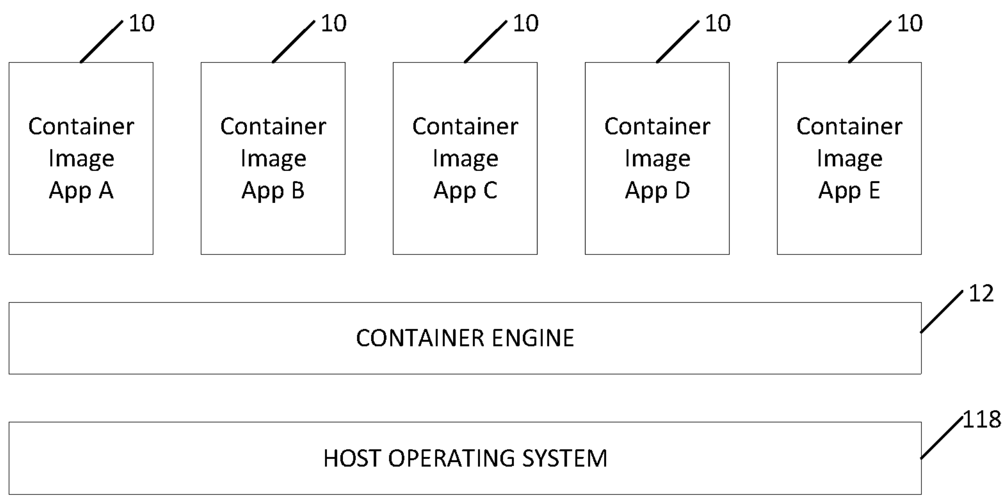
FIG. 2 is a block diagram of a containerized computing architecture according to various embodiments of the present invention.

FIG. 2 is a diagram of an illustrative container architecture, such as for one of the service containers 150A-B. A container is a standard unit of software that packages up code and all its dependencies so that the application runs quickly and reliably from one computing environment to another. When a container is not running, however, it exists only as a saved file called a container image 10. Each container image 10 is a package of the application source code, binaries, files, and other dependencies that will live in the running container. When a containerized application starts, the contents of its container image 10 are copied before they are spun up in a container instance. Each container image 10 can be used to instantiate any number of containers. In addition, container images can be shared with others via a public or private container registry. To promote sharing and maximize compatibility among different platforms and tools, container images are typically created in the industry-standard Open Container Initiative (OCI) format.

A container engine 12 is a lightweight, standalone, executable package of software that includes everything needed to run an application: code, runtime, system tools, system libraries and settings. The container engine 12 enables the host OS 118 to act as a container host. The container engine 12 accepts user commands to build, start, and manage containers through client tools (including CLI-based or graphical tools), and it provides an API that enables external programs to make similar requests. The container engine 12 can comprise a container runtime, which is responsible for creating the standardized platform on which applications can run, for running containers, and for handling the container's storage needs on the local system.

Docker is a set of platform-as-a-service products that use OS-level virtualization to deliver software in containers. OpenShift from Red Hat is a Docker-based, layered system that abstracts the creation of Linux-based container images. Cluster management and orchestration of containers on multiple hosts is handled by Kubernetes.

Figure 3:
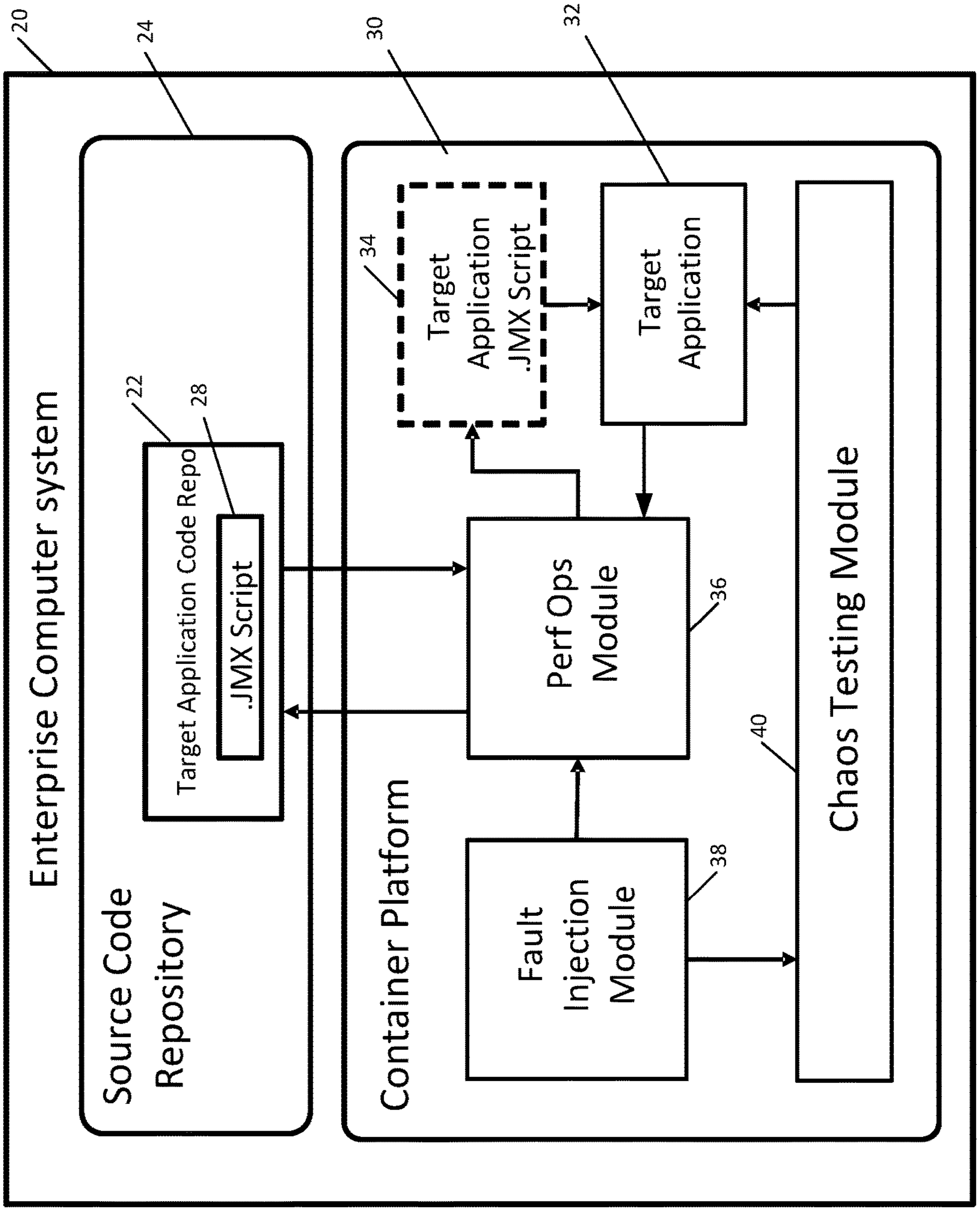
FIG. 3 is a block diagram of a computer system for chaos testing a target application according to various embodiments of the present invention.

Turning now to the novel chaos testing aspects of the present invention, FIG. 3 shows an enterprise computer system 20 for an enterprise to test a containerized target application 32 of the enterprise. In various embodiments of the present invention, at the time of and during the chaos testing, the copy of the target application 32 is not being used for production purposes by the enterprise; that is, the copy of the target application 32 that is tested can be a non-production version of the target application. For example, the copy of the target application 32 can be offline during the chaos testing. In that connection, the enterprise computer system 32 may include a database(s) (not shown) that stores data to be used by the target application 32 in the testing to respond to requests to the target application during the testing. The database used by the non-production target application 32 during the chaos testing may not be a production database (i.e., a database used in production by the enterprise) so as to not affect any production databases during the chaos testing. In other embodiments described further below, a production version, such as a "canary" production version, of the target application could be chaos tested as described herein.

The enterprise computer system 20 can include, or be implemented as part of, one or more clusters 100, such as shown in FIG. 1. Also, the target application 32 could run on one or more pods, depending on the target application.

In this example, a static repository copy of the code 22 for the target application 32 to be chaos-tested may be stored in a source code repository 24, such as a Git-based repository such as Bitbucket. Various embodiments of the present invention rely on Apache JMeter as the load-testing tool for the target application, and JMeter typically requires a Java Management Extensions (JMX) script. Accordingly, the repository 24 can store a JMX script 28 for the target application according to various embodiments. JMeter can be run by running jmeter.bat for Windows or JMeter for Unix. The JMX script can be created using, for example, a Postman-to-JMX converter, BlazeMeter, or BadBoy.

The illustrated enterprise computer system 20 also comprises a container platform 30. The container platform 30 can manage containerized applications and, in various embodiments, an OpenShift container platform, from Red Hat Software, can be used. The container platform comprises, according to various embodiments, the non-production copy of the target application 32, the JMX script 34 for the target application (generated from the target application code repository 22), a "Perf Ops" software module 36, a fault injection module 38, and a chaos-testing module.

Importantly, the target application 32 can be tested based on, simultaneously, (i) simulated traffic flow (e.g., transactions per second) for the target application 32 that is generated with the perf ops module 36 and using the JMX script 34 and (ii) chaos event setting for chaos events or conditions that are injected from the chaos testing module into the target application 32. The chaos events or conditions can be user-defined via the fault injection module 38, as described further below.

The JMX script 34 simulates a non-chaotic, traffic condition for the target application 32 for the testing, e.g., a steady state traffic condition. For example, traffic data for the production version of the target application can be captured, such as via a traffic monitoring application or system, so that typical traffic patterns can be learned, and the simulated traffic for the non-production copy of the target application 32 used for the chaos testing can replicate, or sample, a known or typical, or even outlier, traffic scenario for the production version of the target application to generate the simulated traffic flow for the non-production version of the target application 32. The simulated traffic condition can include or specify, for example, a number of transactions per second for the testing, where the transactions can be, for example, HTTP requests to the target application 32. The simulated traffic might also simulate, for example, a number of users for the target application, over the duration of the chaos testing, that is typical for the production version of the target application. The simulated traffic can be similar to the historical traffic patterns that it simulates, such as within an upper and lower bound (e.g., +/−5%) of the typical peak transactions and users. A user performing the chaos testing may select the simulated traffic condition for the target application 32 for the testing via the perf op module 36. That is, the perf ops module 36 may provide a user interface (e.g., a browser based user interface) through which the user can, for example, select a simulated traffic condition from a pre-established menu of possible simulated traffic scenarios, or the user can design or specify, via the user interface of the perf ops module 36, a custom simulated traffic scenario for the testing. The perf ops module 36 can transmit the parameters for the user selection for the simulated traffic condition to the JMX script 34, and the JMX script then generates the simulated traffic for the target application 32 according to the user's specification for the testing. That way, the response of the non-production target application 32 to the chaos events for the simulated traffic scenario (e.g., number of users interacting with target application 32, number of HTTP requests to the target application 32, etc.) can be monitored, and changes to the production version of the target application 32 to better address such chaos events under similar traffic conditions can be made.

In various embodiments, the chaos-testing module 40 can use LitmusChaos, which is a cloud-native, open source chaos-engineering framework for Kubernetes environments. It can be installed in an OpenShift containerized environment. As such, in various embodiments, the chaos-testing module 40 can receive YAML declarations for the chaos conditions from the fault injection module 38, to be injected into the target application 32. YAML is a human-readable data-serialization language often used for writing configuration files, such as, in this case, configuration files for the chaos-testing module. The structure of a YAML file can be, for example, a map or a list, and it can follow a hierarchy depending on the indentation, and how key values are defined. In that connection, the fault injection module 38 may be a software program that allows a user, e.g., the person or the team of persons conducting the chaos engineering test, to, via a user interface (e.g., a browser-based user interface) provided by the fault injection module 38, select the target application 32 for the chaos testing and to set the parameters for the chaos testing.

In various embodiments, the fault injection module user interface can use a name-space approach. The user interface can have different name spaces, like folders, each with selection options for different types of chaos tests. The options allow, for example, the user to select the target application 32 for the testing and to select chaos parameters for the testing. The chaos parameters can vary by name-space, which can vary by the type of test. Some exemplary parameters that can be specified via the fault injection module 38 for the chaos testing include:

CPU Stress: Consumes CPU resources of the target application container to simulate CPU spikes to test overall target application response when this occurs.

Memory Stress: Consumes memory resources of the application container to simulate memory spikes to test overall application response when this occurs.

DNS Spoof: Spoofs Domain Name System (DNS) resolution in Kubernetes pods, causing incorrect IP addresses to determine the resiliency of the target application when host names are resolved incorrectly.

Container Kill: Induces container failure of specific/random replicas on the target application's resources to test for recovery workflow.

Network Latency: Induces latency to a specified container using traffic control to evaluate the target application's resilience to network delays.

Network Loss: Injects packet loss to a specified container using traffic control to test the application's resilience to unreliable networks.

Pod Kill: Simulates forced or graceful pod failure on specific/random replicas of the target application's resources to test for recovery workflow.

Below is an example of pseudo code for the chaos-testing module 40 for a CPU stress test.

CPU Stress Test Pseudo Code

```
"apiVersion: litmuschaos.io/v1alpha1
kind: ChaosEngine
metadata:
```

-continued

| CPU Stress Test Pseudo Code |
|---|

```
  name: cpu-chaos
  namespace: chaos
spec:
  # It can be true/false
  annotationCheck: 'false'
  # It can be active/stop
  engineState: 'active'
  appinfo:
    appns: 'chaos'
    applabel: 'app=accountsummary'
    appkind: 'deployment'
  chaosServiceAccount: pod-cpu-hog-sa
  monitoring: false
  # It can be delete/retain
  jobCleanUpPolicy: 'delete'
  experiments:
    - name: pod-cpu-hog
      spec:
        components:
          env:
            #number of cpu cores to be consumed
            #verify the resources the app has been launched with
            - name: CPU__CORES
              value: '2'
            - name: TOTAL__CHAOS__DURATION
              value: '60' # in seconds
            - name: CHAOS__KILL__COMMAND
              value: "kill -9 $(ps |grep [m]d5sum|awk {'print $1'})""
```

Below is an example of pseudo code for the chaos-testing module 40 for a Pod Kill test.

| Pod Kill Test Pseudo Kill |
|---|

```
apiVersion: litmuschaos.io/v1alpha1
kind: ChaosEngine
metadata:
  name: demo-delete-chaos-1
  namespace: chaos
spec:
  appinfo:
    appns: 'chaos'
    applabel: 'app=demo'
    appkind: 'deployment'
  # It can be true/false
  annotationCheck: 'false'
  # It can be active/stop
  engineState: 'active'
  chaosServiceAccount: pod-delete-sa
  # It can be delete/retain
  jobCleanUpPolicy: 'delete'
  experiments:
    - name: pod-delete
      spec:
        components:
          env:
            # set chaos duration (in sec) as desired
            - name: TOTAL__CHAOS__DURATION
              value: '30'
            # set chaos interval (in sec) as desired
            - name: CHAOS__INTERVAL
              value: '10'
            # pod failures without '--force' & default
            terminationGracePeriodSeconds
            - name: FORCE
              value: 'false'
```

Once the user finalizes the user selections, the fault injection module 38, for example, packages the user selections for the chaos testing into a YAML file for the chaos-testing module 40. The chaos testing module 40 reads the parameters from the received YAML file and initiates the chaos experiment for the target application 32 based on the read, user-specified chaos parameters. In particular, based on the parameters in the YAML file, the chaos-testing module can orchestrate the chaos injection into the target application 32.

During the testing, the Perf Ops module 36 can monitor and track the responses from the target application 32 to requests in the simulated traffic flow and display, for the user, codes for the responses. For example, if the target application 32 successfully responded to a request in the simulated traffic, an HTTP 200 OK status code be assigned to the request. Other status codes, e.g., HTTP status codes, could be assigned as needed based on the target application's response, such as 401 (unauthorized request), 404 (not found), etc. In various embodiments, a GrafanaLabs dashboard can be used for the Perf Ops module 36.

Figure 4:
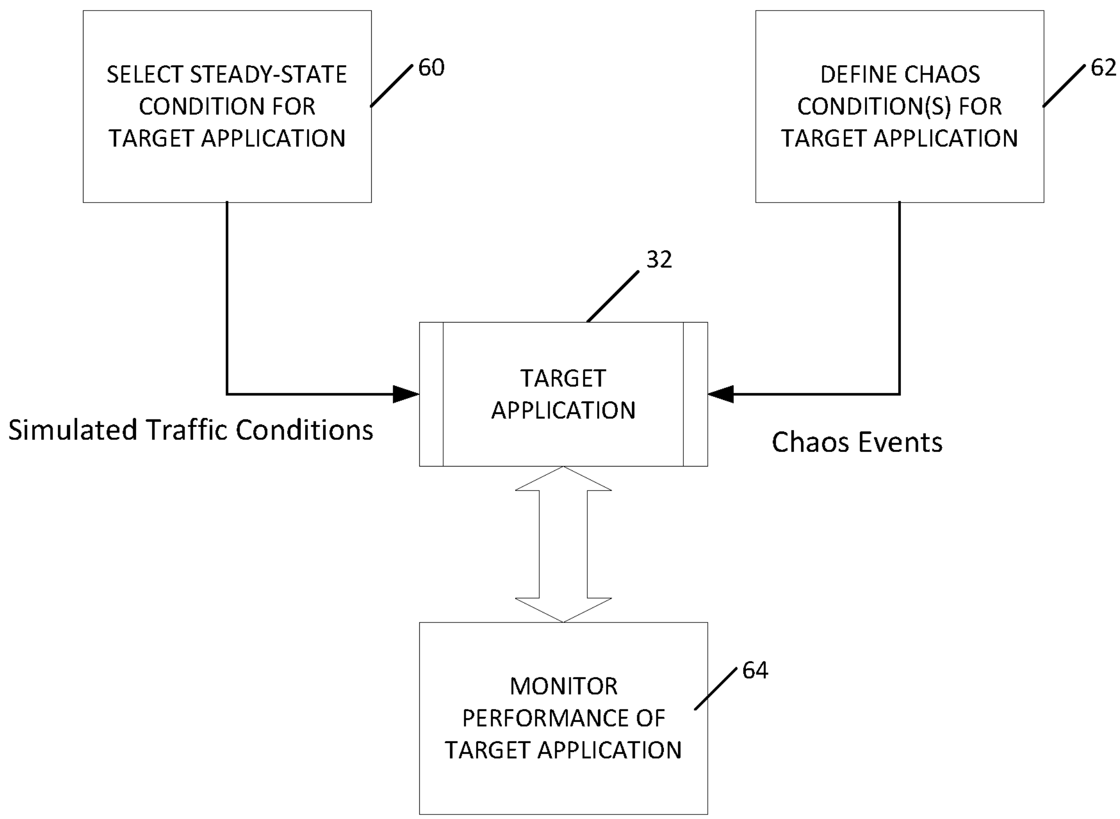
FIG. 4 illustrate a process flow of the computer system of FIG. 3 according to various embodiments of the present invention.

FIG. 4 depicts a process flow for chaos testing the target application 32 using the enterprise computer system 20 of FIG. 3 according to various embodiments. At step 60, the user can specify the steady state conditions for the target application 32 for the testing, e.g., the conditions of the simulated traffic flow for the target application 32 for the testing. As described above, the user may specify the conditions via the interface of the perf ops module 36. The conditions might include the simulated transactions per second (e.g., simulated HTTP request per second) for the target application 32 for the testing. The user could also specify the number of users. And in other types of embodiments, different types of transactions, and the corresponding rates therefor, could be simulated, such as database queries or other database operations, user authentications, images processed, file downloads, containers or pods brought online, payments initiated, etc. At step 62, the user can also specify the chaos conditions for the testing of the target application 32. The user specify the chaos conditions via the fault injection module 38 as described above.

Steps 60 and 62 may be performed in any sequence. When the chaos testing is initiated, the target application 32 is run (or executed) by the, for example, the container platform 30, such that, at step 64, the perf ops module 36 can monitor (and display on a dashboard) the performance of the target application 32 from, simultaneously, the simulated traffic conditions and the chaos conditions. As described above, the performance monitoring can include capturing and displaying HTTP status codes generated by the target application 32 in response to the simulated HTTP requests to it during the testing and under the simultaneous burden of the chaos conditions.

Figure 5:
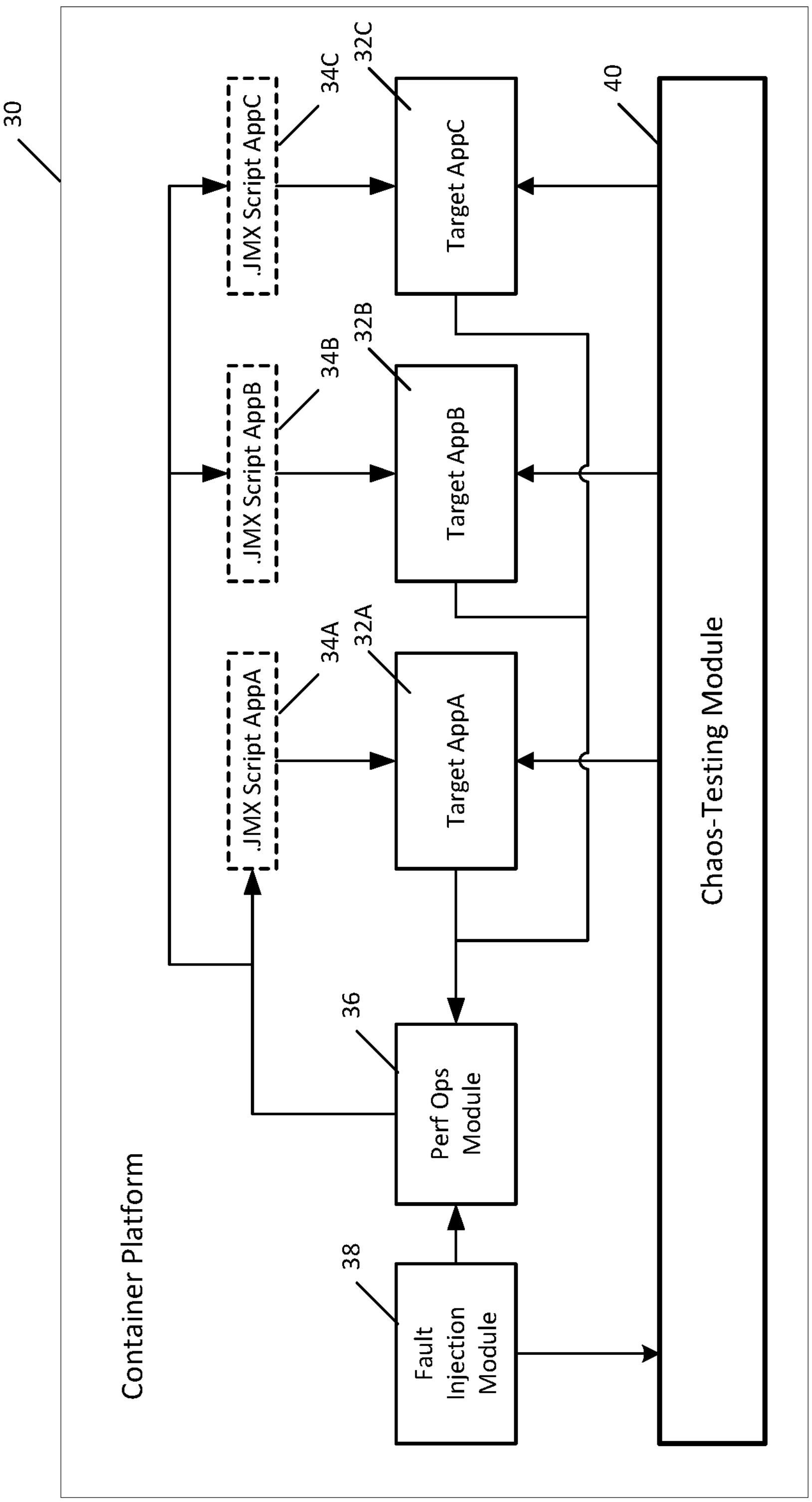
FIG. 5 is a diagram of a computer system for chaos testing multiple target applications concurrently according to various embodiments of the present invention.

In some embodiments, the target application 32 tested in the above-described manner is a containerized application, such as service containers 150A-B in FIG. 1, that is deployed in a containerized environment, such as OpenShift or other Kubernetes platforms. In other embodiments, multiple target applications 32 may be tested simultaneously, or in a coordinated manner, as shown in FIG. 5. FIG. 5 shows three target applications 32A, 32B and 32C. As with the embodiment described above for FIG. 2, the user can select the chaos parameters for the target applications 32A-C via the fault injection tool 38, and the fault injection tool 38 can package the chaos parameters in YAML files for the chaos-testing module 40. The chaos-testing module 40 then injects the chaos events to the corresponding target applications 32A-C. In a like manner, the perf ops module 36 generates simulated traffic streams for the respective target applications 32A-C via respective JMX scripts 34A-C. The perf ops module 36 can also provide the dashboard to monitor the performance of the target applications 32A-C in response to both, simultaneously, the simulated traffic and the injected chaos conditions. For simplicity, FIG. 5 does not show the source code repository 24 that is shown in FIG. 3, but in the FIG. 5 embodiment, the source code repository 24 could store source code repositories for each of the target applications 32A-C.

In other embodiments, the system can be used to chaos test an application running on a virtual machine (VM), such as VM 122 in FIG. 1. A differentiator between containers and virtual machines is that virtual machines virtualize, e.g., provide complete emulation of, an entire machine down to low level hardware layers, and containers only virtualize software layers above the operating system level. With a VM, a hypervisor 120, or a virtual machine monitor, is software, firmware, or hardware that creates and runs the VM 122. Within each VM 122 runs a unique guest operating system 196. VMs with different operating systems can run on the same infrastructure, e.g., a physical host 110 with its own host operating system 118.

The perf ops module 36, fault injection module 38 and chaos testing 40 can be software modules stored in the memory devices 114A-B and executed by the host CPU 112, using any suitable computer language, such as, for example, SAS, Java, C, C++, or Perl using, for example, conventional or object-oriented techniques. The software code may be stored as a series of instructions or commands in the computer memory devices 114A-B. To that end, below is pseudo code for the perf ops module 36 to perform the load performance testing with a JMX script.

```
“<?xml version=“1.0” encoding=“UTF-8”?>
<jmeterTestPlan version=“1.2” properties=“5.0” jmeter=“5.4.1”>
  <hashTree>
    <TestPlan guiclass=“TestPlanGui” testclass=“TestPlan” testname=“PerfOps Load Test
Script” enabled=“true”>
      <boolProp name=“TestPlan.functional__mode”>false</boolProp>
      <stringProp name=“TestPlan.comments”></stringProp>
      <boolProp name=“TestPlan.serialize__threadgroups”>false</boolProp>
      <stringProp name=“TestPlan.user__define__classpath”></stringProp>
      <elementProp name=“TestPlan.user__defined__variables” elementType=“Arguments”>
        <collectionProp name=“Arguments.arguments”/>
      </elementProp>
    </TestPlan>
    <hashTree>
      <ThreadGroup guiclass=“ThreadGroupGui” testclass=“ThreadGroup” testname=“Http
URL/API Test” enabled=“true”>
        <elementProp name=“ThreadGroup.main__controller” elementType=“LoopController”
guiclass=“LoopControlPanel” testclass=“LoopController” enabled=“true”>
          <boolProp name=“LoopController.continue__forever”>false</boolProp>
          <intProp name=“LoopController.loops”>−1</intProp>
        </elementProp>
        <stringProp name=“ThreadGroup.num__threads”>5</stringProp>
        <stringProp name=“ThreadGroup.ramp__time”>1</stringProp>
        <boolProp name=“ThreadGroup.scheduler”>true</boolProp>
        <stringProp name=“ThreadGroup.duration”>3600</stringProp>
        <stringProp name=“ThreadGroup.delay”>0</stringProp>
        <stringProp name=“ThreadGroup.on__sample__error”>continue</stringProp>
        <boolProp name=“ThreadGroup.same__user__on__next__iteration”>true</boolProp>
      </Thread Group>
      <hashTree>
        <CookieManager guiclass=“CookiePanel” testclass=“CookieManager” testname=“Cookie
Manager” enabled=“true”>
          <collectionProp name=“CookieManager.cookies”/>
          <boolProp name=“CookieManager.clearEachIteration”>false</boolProp>
          <boolProp name=“CookieManager.controlledByThreadGroup”>false</boolProp>
        </CookieManager>
        <hashTree/>
        <HTTPSamplerProxy guiclass=“HttpTestSampleGui” testclass=“HTTPSamplerProxy”
testname=“get info” enabled=“true”>
          <elementProp name=“HTTPsampler.Arguments” elementType=“Arguments”
guiclass=“HTTPArgumentsPanel” testclass=“Arguments” enabled=“true”>
            <collectionProp name=“Arguments.arguments”/>
          </elementProp>
          <stringProp name=“HTTPSampler.domain”>lit-mad-catters-outer-api-lit-qa.apps.ocp4-
qa.pncint.net</stringProp>
          <stringProp name=“HTTPSampler.port”></stringProp>
          <stringProp name=“HTTPSampler.protocol”>https</stringProp>
          <stringProp name=“HTTPSampler.contentEncoding”></stringProp>
          <stringProp name=“HTTPSampler.path”>/info</stringProp>
          <stringProp name=“HTTPSampler.method”>GET</stringProp>
          <boolProp name=“HTTPSampler.follow__redirects”>true</boolProp>
          <boolProp name=“HTTPSampler.auto__redirects”>false</boolProp>
          <boolProp name=“HTTPSampler.use__keepalive”>true</boolProp>
          <boolProp name=“HTTPSampler.DO__MULTIPART__POST”>false</boolProp>
          <stringProp name=“HTTPSampler.embedded__url__re”></stringProp>
          <stringProp name=“HTTPSampler.connect__timeout”></stringProp>
          <stringProp name=“HTTPSampler.response__timeout”></stringProp>
        </HTTPSamplerProxy>
        <hashTree>
          <HeaderManager guiclass=“HeaderPanel” testclass=“HeaderManager”
testname=“getinfo” enabled=“true”>
            <collectionProp name=“HeaderManager.headers”/>
          </HeaderManager>
```

-continued

```
            <hashTree/>
          </hashTree>
          <ResultCollector guiclass=“ViewResultsFullVisualizer” testclass=“ResultCollector”
testname=“View Results Tree” enabled=“true”>
            <boolProp name=“ResultCollector.error_logging”>false</boolProp>
            <objProp>
              <name>saveConfig</name>
              <value class=“SampleSaveConfiguration”>
                <time>true</time>
                <latency>true</latency>
                <timestamp>true</timestamp>
                <success>true</success>
                <label>true</label>
                <code>true</code>
                <message>true</message>
                <threadName>true</threadName>
                <dataType>true</dataType>
                <encoding>false</encoding>
                <assertions>true</assertions>
                <subresults>true</subresults>
                <responseData>false</responseData>
                <samplerData>false</samplerData>
                <xml>false</xml>
                <fieldNames>true</fieldNames>
                <responseHeaders>false</responseHeaders>
                <requestHeaders>false</requestHeaders>
                <responseDataOnError>false</responseDataOnError>
                <saveAssertionResultsFailureMessage>true</saveAssertionResultsFailureMessage>
                <assertionsResultsToSave>0</assertionsResultsToSave>
                <bytes>true</bytes>
                <sentBytes>true</sentBytes>
                <url>true</url>
                <threadCounts>true</threadCounts
                <idleTime>true</idleTime>
                <connectTime>true</connectTime>
              </value>
            </objProp>
            <stringProp name=“filename”></stringProp>
          </ResultCollector>
          <hashTree/>
        </hashTree>
      </hashTree>
    </hashTree>
</jmeterTestPlan>”
```

Figure 6:
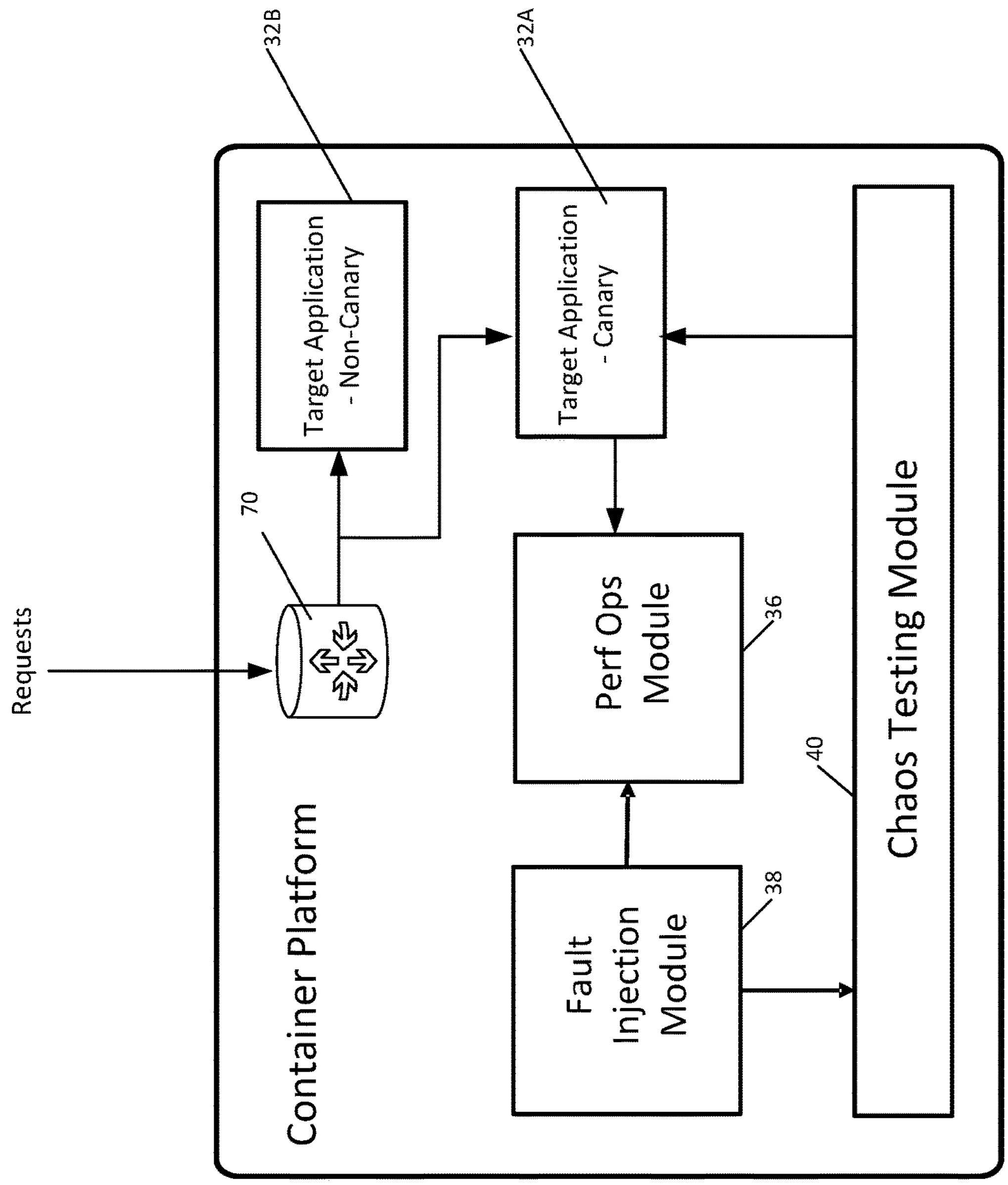
FIG. 6 is a diagram of the computer system for chaos testing according to other embodiments of the present invention.

As mentioned previously, the inventive chaos testing system could also be used for a production version of the target application, as shown in the exemplary embodiment depicted in FIG. 6. The target application could be, for example, an application that is not supposed to have downtime, such as banking-related application that is for processing financial transactions, account authentications, etc. For testing in a production environment, simulated traffic for the target application is not used; instead, the performance of the target application in responding to actual requests to the target application, under the chaos conditions, is evaluated. To limit the impact of the chaos testing on the performance of the target application, a “canary” version of the target application can be subjected to the chaos testing. That is, as shown in FIG. 6, there can be a canary version 32A of the target application and a non-canary version 32B. Only the canary version 32A is subject to the chaos injections from the chaos-testing module 40 during the testing. The non-canary version 32B does not receive the chaos testing events. A router 70 can selectively route incoming requests to the target application to either the canary version 32A or the non-canary version 32B. To minimize the impact of the overall production-environment performance of the target application, the router 70 can route a majority of the incoming requests, such as 90% or more, to the non-canary version 32B.

As before with a non-production version of the target application, in the production version testing shown in FIG. 6, the user can specify the parameters for the chaos conditions via the fault injection module 38, which can send the parameters in a YAML file to the chaos testing module 40, which can then inject the chaos conditions to the canary version 32A. The perf ops module 36 can monitor the incoming request to the canary version 32A and monitor the performance of the canary version 32A in response to the incoming requests and the injected chaos conditions.

In one general aspect, the present invention, therefore, is directed to computer systems and methods for performing a chaos experiment for a target application. The computer system can comprise one or more processors, and computer memory in communication with the one or more processors. The computer memory stores instructions that when executed by the one or more processors, causes the one or more processors to: (i) generate, for the chaos experiment, a simulated traffic stream for a non-production version of the target application; (iii) provide chaos event settings for one or more chaos conditions to the non-production version of the target application; (iv) execute the non-production version of the target application during the chaos experiment, such that the non-production version of the target application, during the chaos experiment, (a) generates responses to the simulated traffic stream while simultaneously (b) being subject to the one or more chaos conditions of the chaos event settings; and (iv) monitor the responses generated by the non-production version of the target application during the chaos testing.

A computer-implemented method according to embodiments of the present invention can comprise the steps of: (i) generating, for the chaos experiment, with a computer system that comprises one or more processors, a simulated traffic stream for a non-production version of the target application; (ii) providing, by the computer system, chaos event settings for one or more chaos conditions to the non-production version of the target application; (iii) executing, by the computer system, the non-production version of the target application during the chaos experiment, such that the non-production version of the target application, during the chaos experiment, (a) generates responses to the simulated traffic stream while simultaneously (b) being subject to the one or more chaos conditions of the chaos event settings; and (iv) monitoring, by the computer system, the responses generated by the non-production version of the target application during the chaos testing.

According to various implementations, the computer memory further stores instructions that when executed by the one or more processors, causes the one or more processors to: generate a declarative YAML file defining chaos condition parameters for the one of more chaos conditions for the chaos experiment for the target application, where the chaos condition parameters for the one or more chaos conditions are based on a user input for the chaos experiment; and provide the chaos event setting to the non-production version of the target application based on the chaos condition parameters file from the declarative YAML Also, the computer memory can further store instructions that when executed by the one or more processors, causes the one or more processors to generate the simulated traffic stream from a JMX script for the target application. Still further, the simulated traffic stream can comprises HTTP requests and the responses generated by the non-production version of the target application comprise HTTP status codes. The simulated traffic stream can simulate a historical traffic stream for a production version of the target application.

In various implementations, the chaos condition can comprise one or more of the following: CPU stress for a container for the target application; network loss for the container for the target application;

memory stress for the container for the target application; DNS spoof for a pod for the target application; container kill for the container for the target application; network latency for the container for the target application; and pod failure for the pod for the target application.

In various implementations, the target application comprises a containerized application or an application running on a virtual machine.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system for performing a chaos experiment for a target application, the computer system comprising:

one or more processors; and computer memory in communication with the one or more processors, wherein the computer memory stores instructions that when executed by the one or more processors, causes the one or more processors to:

generate, for the chaos experiment, a simulated traffic stream for a non-production version of the target application based on a simulated traffic condition, wherein the simulated traffic condition is selected by a user from a plurality of simulated traffic scenarios, wherein the simulated traffic stream simulates a historical traffic stream for a production version of the target application, and wherein the historical traffic stream comprises a learned traffic pattern defined within an upper and lower bound of at least one of a peak number of transactions per second or a peak number of users for the target application;

provide chaos event settings for one or more chaos conditions to the non-production version of the target application;

execute the non-production version of the target application during the chaos experiment, such that the non-production version of the target application, during the chaos experiment, (i) generates responses to the simulated traffic stream while simultaneously (ii) being subject to the one or more chaos conditions, wherein the simulated traffic stream and the one or more chaos conditions are executed in a coordinated manner based on declarative user-defined parameters; and monitor the responses generated by the non-production version of the target application during the chaos experiment.

2. The computer system of claim 1, wherein:

the declarative user-defined parameters comprise chaos condition parameters; and the computer memory further stores instructions that when executed by the one or more processors, causes the one or more processors to:

generate a declarative YAML file defining the chaos condition parameters for the one or more chaos conditions for the chaos experiment for the target application, wherein the chaos condition parameters for the one or more chaos conditions are based on a user input for the chaos experiment; and provide the chaos event settings to the non-production version of the target application based on the chaos condition parameters from the declarative YAML file.

3. The computer system of claim 2, wherein the declarative user-defined parameters comprise custom traffic stream conditions, wherein the computer memory further stores instructions that when executed by the one or more processors, causes the one or more processors to generate the simulated traffic stream from a Java Management Extensions (JMX) script for the target application based on the custom traffic stream conditions.

4. The computer system of claim 3, wherein:

the simulated traffic stream comprises Hypertext Transfer Protocol (HTTP) requests; and the responses generated by the non-production version of the target application comprise HTTP status codes.

5. The computer system of claim 4, the one or more chaos conditions comprises a condition selected from the group consisting of:

central processing unit (CPU) stress for a container for the target application;

network loss for the container for the target application;

memory stress for the container for the target application;

Domain Name System (DNS) spoof for a pod for the target application;

container kill for the container for the target application;

network latency for the container for the target application; and pod failure for the pod for the target application.

6. The computer system of claim 1, wherein the target application comprises a containerized application.

7. The computer system of claim 1, wherein the target application comprises an application running on a virtual machine.

8. The computer system of claim 1, wherein:

the simulated traffic stream comprises HTTP requests; and the responses generated by the non-production version of the target application comprise HTTP status codes.

9. The computer system of claim 1, wherein the one or more chaos conditions comprises a condition selected from the group consisting of:

CPU stress for a container for the target application;

network loss for the container for the target application;

memory stress for the container for the target application;

DNS spoof for a pod for the target application;

container kill for the container for the target application;

network latency for the container for the target application; and pod failure for the pod for the target application.

10. A computer system for performing a chaos experiment for a target application, the computer system comprising:

means for generating, for the chaos experiment, a simulated traffic stream for a non-production version of the target application based on a simulated traffic condition, wherein the simulated traffic condition is selected by a user from a plurality of possible simulated traffic scenarios, and wherein the plurality of possible simulated traffic scenarios comprises a learned traffic stream based on monitoring of a production version of the target application, and wherein the learned traffic stream is defined within at least one of an upper and lower bound of a peak number of users for the target application or an upper and lower bound of a peak number of transactions per second; and means for providing chaos event settings for one or more chaos conditions to the non-production version of the target application, wherein during the chaos experiment, the non-production version of the target application is executed by the computer system such that the non-production version of the target application, during the chaos experiment, (i) generates responses to the simulated traffic stream while simultaneously (ii) being subject to the one or more chaos conditions, wherein the simulated traffic stream and the chaos conditions are executed in a coordinated manner based on declarative user-defined parameters.

11. A computer-implemented method for performing a chaos experiment for a target application, the method comprising:

receiving, for the chaos experiment, by a computer system that comprises one or more processors, a signal indicative of a user selection corresponding to a simulated traffic condition selected by a user;

generating, for the chaos experiment, with the computer system, a simulated traffic stream for a non-production version of the target application based on the simulated traffic condition, wherein the simulated traffic stream simulates a historical traffic stream for a production version of the target application, and wherein the historical traffic stream comprises a learned traffic pattern defined within an upper and lower bound of at least one of a peak number of transactions per second or a peak number of users for the target application;

providing, by the computer system, chaos event settings for one or more chaos conditions to the non-production version of the target application;

executing, by the computer system, the non-production version of the target application during the chaos experiment, such that the non-production version of the target application, during the chaos experiment, (i) generates responses to the simulated traffic stream while simultaneously (ii) being subject to the one or more chaos conditions, wherein the simulated traffic stream and the chaos conditions are executed in a coordinated manner based on declarative user-defined parameters; and monitoring, by the computer system, the responses generated by the non-production version of the target application during the chaos experiment.

12. The method of claim 11, wherein:

the declarative user-defined parameters comprise chaos condition parameters; and providing the chaos event settings to the non-production version of the target application comprises:

generating a declarative YAML file defining the chaos condition parameters for the one or more chaos conditions for the chaos experiment for the target application, wherein the chaos condition parameters for the one or more chaos conditions are based on a user input for the chaos experiment; and providing the chaos event settings to the non-production version of the target application based on the chaos condition parameters from the declarative YAML file.

13. The method of claim 12, wherein generating the simulated traffic stream comprises generating the simulated traffic stream from a Java Management Extensions (JMX) script for the target application.

14. The method of claim 13, wherein:

the simulated traffic stream comprises Hypertext Transfer Protocol (HTTP) requests; and the responses generated by the non-production version of the target application comprise HTTP status codes.

15. The method of claim 14, wherein the one or more chaos conditions comprises a condition selected from the group consisting of:

central processing unit (CPU) stress for a container for the target application;

network loss for the container for the target application;

memory stress for the container for the target application;

Domain Name System (DNS) spoof for a pod for the target application;

container kill for the container for the target application;

network latency for the container for the target application; and pod failure for the pod for the target application.

16. The method of claim 11, wherein the target application comprises a containerized application.

17. The method of claim 11, wherein the target application comprises an application running on a virtual machine.

18. The method of claim 11, wherein:

the simulated traffic stream comprises HTTP requests; and the responses generated by the non-production version of the target application comprise HTTP status codes.

19. The method of claim 11, wherein the one or more chaos conditions comprises a condition selected from the group consisting of:

CPU stress for a container for the target application;

network loss for the container for the target application;

memory stress for the container for the target application;

DNS spoof for a pod for the target application;

container kill for the container for the target application;

network latency for the container for the target application; and pod failure for the pod for the target application.

* * * * *